INVENTORS
RICHARD F. BUSWELL
RICHARD A. SEDERQUIST
HERBERT J. SETZER
DANIEL J. SNOPKOWSKI
BY
Charles A. Warren
ATTORNEY INVENTOR
RICHARD F. BUSWELL
RICHARD A. SEDERQUIST
HERBERT J. SETZER
DANIEL J. SNOPKOWSKI BY Charles A. Warren

ATTORNEY

INVENTORS
RICHARD F. BUSWELL
RICHARD A. SEDERQUIST
HERBERT J. SETZER
DANIEL J. SNOPKOWSKI

BY

*Charles A. Warren*

ATTORNEY

INVENTORS
RICHARD F. BUSWELL
RICHARD A. SEDERQUIST
HERBERT J. SETZER
DANIEL J. SNOPKOWSKI

BY
Charles A. Warren
ATTORNEY

United States Patent Office 3,446,594
Patented May 27, 1969

3,446,594
METHOD FOR GENERATING HYDROGEN FROM LIQUID HYDROGEN-CONTAINING FEEDSTOCKS
Richard F. Buswell, Glastonbury, Richard A. Sederquist, Newington, Herbert J. Setzer, Ellington, and Daniel J. Snopkowski, West Hartford, Conn., assignors to United Aircraft Corporation, East Hartford, Conn., a corporation of Delaware
Filed Aug. 3, 1965, Ser. No. 476,906
Int. Cl. C01b 1/18
U.S. Cl. 23—210          22 Claims

ABSTRACT OF THE DISCLOSURE

There is disclosed a process for providing substantially pure hydrogen from hydrogen containing feedstock wherein the feedstock is admixed with water and heated, passed through a bed of dehydrogenation catalyst to produce methane-rich stream, and the methane-rich steam is then passed through an additional bed of dehydrogenation catalyst to effect conversion of the methane to carbon oxide products and hydrogen. The converted methane stream is passed in heat exchange relationship with the first catalyst bed countercurrent to the flow of the mixture of feedstock and water therethrough to establish a thermal decline from the outlet to the inlet end thereof and to decrease the temperature of the converted stream.

---

The present invention relates to the conversion of hydrogen-containing carbonaceous feedstocks and, more particularly, to a novel method and apparatus for obtaining hydrogen from hydrogen-containing carbonaceous feedstocks by catalytic dehydrogenation thereof.

Because of a desire to produce electric current from relatively small power plants, there have been considerable efforts in the area of fuel cells wherein the energy generated by the oxidation-reduction chemical reaction at spaced electrodes is directly converted into electrical energy to operate in an external circuit between the electrodes devices which provide a load. Although some fuel cells devices have been produced which utilize relatively impure hydrogen or other oxidizable fuels, generally pure hydrogen has been recognized as the preferred fuel and its coreactant has generally been oxygen or oxygen in air.

Although various techniques have been proposed for converting hydrocarbons and other hydrogen-containing carbonaceous feed-stocks into hydrogen for use in such cells, generally primary emphasis has been placed upon catalytic conversion at relatively high temperatures; i.e. about 700° centigrade. Passage of the resultant gas stream through purifiers employing such means as palladium membranes which are selectively permeable to hydrogen has been employed to minimize the impurities which might contaminate the fuel cell electrolyte which is generally alkaline.

Recently it has been proposed to employ a system wherein the carbonaceous feedstock is admixed with water and initially passd through a low-temperature catalytic reformer to reform the higher molecular weight feedtock to a methane-rich stream which is subsequently passed through a high-temperature catalytic converter to produce hydrogen and carbon oxide products. Thereafter, the effluent stream from the converter which contains significant amounts of carbon monoxide is passed to a catalytic shift converter operated at relatively low temperatures wherein the carbon monoxide is converted to carbon dioxide and additional hydrogen. However, the several steps involved and the different heat requirements of the several steps present problems in minimizing the size of such eiquipment and in attaining a realtively high degree of thermal efficiency.

It is an object of the present invention to provide a novel method for the catalytic conversion of a hydrogen-containing carobnaceous feedstock to hydrogen wherein there is provided a relatively high degree of thermal efficiency and which is adapted to relatively compact apparatus for producing a stream of high purity hydrogen.

Another object of the present invention is to provide such a method wherein the sensible heat of the reaction products and heating fluids are utilized to a very high degree of efficiency so as to minimize external fuel requirements of the system.

Yet another object is to provide a novel shift conversion and hydrogen purification apparatus and method which efficiently employs the heat from the exothermic shift conversion reaction.

A specific object is to provide such an apparatus having a high degree of portability, rugged construction, relative simplicity of design and ease of operation which lends itself to field usage as a generator of hydrogen for a fuel cell apparatus.

Other objects and advantages will be readily apparent to those skilled in the art from the following detailed specification and claims and the attached drawings wherein:

Figure 1:
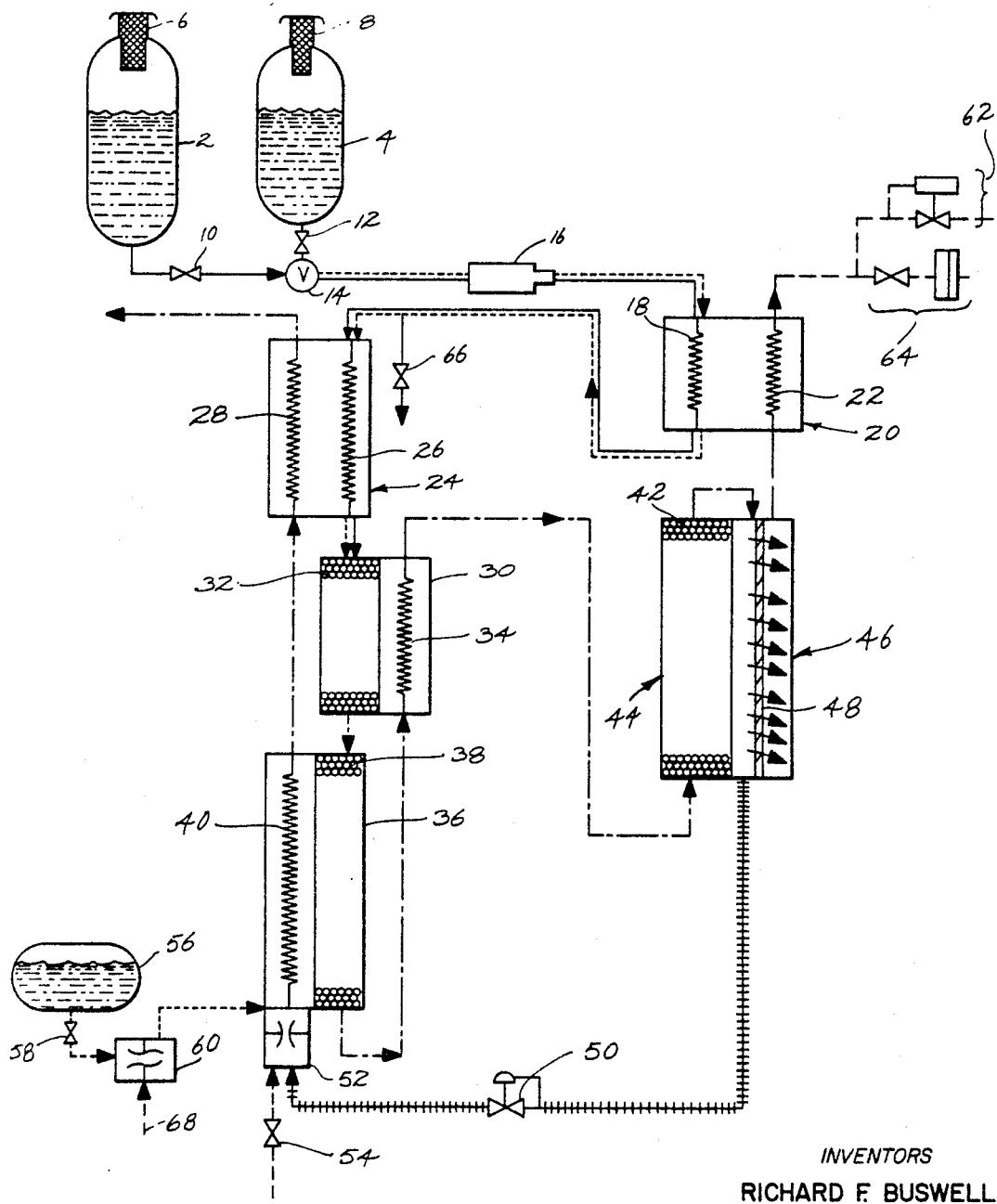
FIGURE 1 is a diagrammatic representation of a process and apparatus embodying the present invention.

It has now been found that the foregoing and related objects can readily be attained by a method in which a mixture of hydrogen-containing carbonaceous feedstock is mixed with water and heated to elevate the temperature thereof to about 205 to 510° centigrade after which it is passed through a first bed of a dehydrogenation catalyst at an outlet temperature of about 370 to 650° centigrade to react substantially all of said feedstock to produce a methane-rich stream. The stream from the first catalyst bed is then passed through an additional bed of dehydrogenation catalyst at an outlet temperature of 700 to 990° centigrade to effect conversion of substantially all the methane in the stream to carbon oxide products and hydrogen. The stream from the additional bed is passed in heat exchange contact with the first bed in countercurrent flow to the mixture passing therethrough to establish a thermal decline from the outlet to the inlet end thereof and to decrease the temperature of the stream.

The stream which is now at a decreased temperature is then passed through a bed of a shift conversion catalyst at a temperature of 200 to 480° centigrade to convert substantially all of the carbon monoxide in the stream to carbon dioxide. The stream from the shift conversion catalyst is then passed through a hydrogen purifier in surface contact with one surface of a membrane selectively permeable to hydrogen so that the major portion of hydrogen in the stream diffuses through the membrane and substantially pure hydrogen is collected from the other surface of the membrane. The waste gas from the purifier is then burned adjacent the additional catalyst bed so as to impart the desired heat thereto and the combustion gases from the burning of the waste gas are passed in heat exchange relationship with the mixture in the heating step so as to impart the desired degree of heat thereto.

In the copending application of Richard A. Sederquist, filed Aug. 4, 1965 Ser. No. 480,528, entitled Method and Apparatus for Producing Hydrogen From Hydrogen-Containing Feedstocks there is explained in detail the method for predetermining a thermal incline in a bed of dehydrogenation catalyst operated at relatively low temperature whereby the stream of hydrogen-containing carbonaceous feetstock and water may be reacted so as to produce substantially entirely methane, hydrogen and carbon oxide products while substantially avoiding the carbon forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

Generally, the gaseous stream of the feedstock and water is heated to a temperature of about 205 to 510° centigrade. Thereafter it is passed through a bed of dehydrogenation catalyst which has been heated so as to provide a termal incline from the inlet end to the outlet end thereof with the temperature at the outlet end being about 370 to 650° centigrade. The thermal incline is selected with respect to the feedstock catalyst and conditions of operation to provide an increasing fraction of fuel reacted with increasing temperature along the incline and to avoid substantially the aforementioned carbon forming reactions.

More particularly, it was discovered that by closely controlling the fraction of fuel reacted at a given temperature for a particular feedstock the carbon forming reactions heretofore described may be substantially, if not completely, eliminated. As will be readily appreciated, the fraction of fuel reacted will increase with temperature. The effect of the fraction of fuel reacted upon the carbon forming reaction:

$$CH_4 \rightarrow C + 2H_2$$

may be determined analytically to establish the points below which the methane cracking reaction will occur at a given temperature. Similarly the effect of the fraction of fuel reaction based upon the carbon forming reaction:

$$CO_2 + 2H \rightarrow C + 2H_2O$$

may be calculated. Above this plot the composition of the product is such that carbon will be produced.

These two curves may be graphically presented to define a carbon-free region. With such a graphic presentation, it is relatively easy to construct a model for determining the thermal incline in a prereactor to convert substantially all the hydrogen-containing carbonaceous feedstock to a methane-rich stream.

Whereas maintaining the dehydrogenation catalyst within a range closely approximating an average temperature or at a constant temperature as opposed to a pronounced thermal incline the reaction path will cross the upper carbon forming boundary, i.e. that at which the carbon dioxide and carbon monoxide reactions take place, thus producing elemental cabon which will tend to deteriorate the activity of the catalyst. To avoid this effect, a thermal incline is established in a low temperature converter or prereactor whereby the temperature is increased as the fraction of fuel reacted increases while at the same time staying below the curve (or curves) for the carbon oxide reactions and above the curve for the methane cracking reaction.

The prereactor portion or first catalyst bed generally should have an inlet temperature of about 205 to 510° centigrade and preferably about 370 to 510° centigrade. The outlet of the first catalyst bed, or prereactor, is maintained at a temperature of about 370 to 650° centigrade and preferably 535 to 625° centigrade. The inlet temperature of the second catalyst bed, or reactor portion, is 370 to 650° centigrade and preferably 535 to 625° centigrade. The outlet temperature of the second catalyst bed, or reactor portion, 700 to 990° centigrade and preferably 700 to 815° centigrade.

In order to cause the hydrogen to diffuse through the permeable membrane in the purifier it is necessary to maintain pressures in the system of at least about 100 pounds per square inch absolute and they may range up to about 400 pounds per square inch absolute. Preferably the pressure is maintained on the order of 175 to 225 pounds per square inch absolute.

The temperature within the shift conversion reaction may range from about 205 to about 455° centigrade and preferably is about 300 to 330° centigrade. The hydrogen permeable membranes in the hydrogen purifier are maintained at a temperature of about 205 to 455° centigrade and preferably at about 300 to 330° centigrade.

Within the feedstock preheater, it is generally desirable to elevate the temperature of the mixture from abient temperature to about 60 to 100° centigrade. The boiler is intended to raise the temperature of the feedstock mixture passing therethrough to about 205 to 510° centigrade and preferably about 370 to 510° centigrade.

The space velocity of the combined first and second beds of catalyst, or prereactor and primary reactor, will depend upon the activity of the catalyst and the temperatures and pressures employed in the system. Generally, they may vary between about 500 and 5,000 hours$^{-1}$ and preferably about 1,500 to 3,500 hours$^{-1}$.

The space velocity in the shift conversion catalyst may range from 2,000 to 8,000 hours$^{-1}$ and is preferably about 3,500 to 4,500 hours$^{-1}$.

Various hydrocarbonaceous fuels may be employed in the present process including paraffins, olefins, aromatics and alcohols containing about 5 to 16 carbon atoms. The preferred fuels are saturated hydrocarbons containing 6 to 10 carbon atoms and combinations thereof, either alone or with relatively small amount of unsaturated hydrocarbons. Conveniently, hexane, heptane, octane, nonane, decane, and mixtures thereof, may be employed.

Because of the favorable equilibrium factors in the present invention, a relatively low steam to carbon molar ratio may be employed, i.e. the stoichiometric ratio of 2.0:1.0. Generally, the ratios employed are about 2.0-5.0:1. The term "dehydrogenation catalyst" as used herein is intended to refer to any of the conventional steam reforming catalysts such as nickel, cobalt and platinum.

Referring now in detail to the attached drawings, FIGURE 1 diagrammatically illustrates the process and apparatus of the present invention. A hydrocarbonaceous feedstock tank 2 and water tank 4 are both desirably provided with filter caps 6, 8. Feed lines having individual valves 10, 12 therein communicate with a proportioning valve 14 which blends the two streams in a predetermined ratio. A process pump 16 forces the blended stream through the tubing 18 of the feed preheater generally designated by the numeral 20 wherein the temperature thereof is raised by heat imparted from the tubing 22.

The feed stream is then passed into a boiler generally designated by the numeral 24 wherein it is heated in the tubing 26 by heat supplied through fluid in the tubing 28 to a temperautre on the order of 205 to 510° centigrade. The feed stream is then passed into the prereactor 30 containing dehydrogenation catalyst 32 which is heated by fluid passing through the tubing 34 to a temperature of about 370 to 650° centigrade and wherein initial conversion of the feedstock occurs to produce methane, hydrogen and carbon oxide products.

This stream then passes into the primary reactor 36 and is reacted further by the dehydrogenation catalyst 38 to form hydrogen and carbon oxide products from the methane therein. The catalyst 38 is heated to a temperature of about 700 to 990° centigrade by the burner 40. The stream from the reactor 36 is passed through the tubing 34 of the prereactor 30 in countercurrent flow to the feed stream so as to impart heat to the catalyst at a thermal gradient from the outlet to the inlet.

After the stream has passed through the prereactor 30, its tempearture has been reduced and it is then passed through a bed of catalyst 42 in the shift converter generally designated by the numeral 44 wherein the carbon monoxide reacts with water in the stream to produce additional hydrogen and carbon dioxide. As shown, the exothermic shift converter 44 is coupled with the hydrogen purifier generally designated by the numeral 46 so as to impart heat thereto, and the gas stream from the converter 44 is passed in contact with one surface of a membrane 48 selectively permeable to hydrogen which diffuses to the opposite surface thereof and is collected therefrom.

The residual gases from the purifier 46 which include some hydrocarbons and carbon monoxide are passed through the pressure regulating valve 50 wherein the pressure thereof is decreased and thence into the air ejector 52 wherein air passed by the valve 54 is aspirated thereinto. The air-gas mixture is then burned in the burner 40 to supply the heat for the primary reactor 36 with the hot burner gases then passing about the tubing 28 of the boiler 24 wherein the feed stream is heated and finally being vented to the atmosphere.

To provide the initial heat for the reactor 36 during startup of the apparatus, fuel from the tank 56 is passed through the valve 58 into the startup burner 60 wherein it is burned with air from the line 68. The hot combustion gases from the burner 60 are then passed into the primary reactor to impart heat thereof and also serve to ignite the gas stream from the purifier 46 which will initially be very rich in methane until the primary reactor 36 reaches operating temperature. The startup burner 60 is shut off at this point.

The purified hydrogen passing through the membrane 48 is passed through the tubing 22 of the fuel preheater 20 wherein it imparts heat to the feed stream while being cooled before it reaches the hydrogen pressure relief valve 62 and the hydrogen pressure regulating valve 64 after which it may be passed directly to a fuel cell (not shown) or to a surge tank (not shown).

At shutdown, the bleed valve 66 at the inlet of the boiler 24 may be opened after turning off the pump 16 which automatically closes the system pressure control valve 50. The opening of the bleed valve 66 allows the reaction gases to flow back through the system and to be vented.

Figure 3:
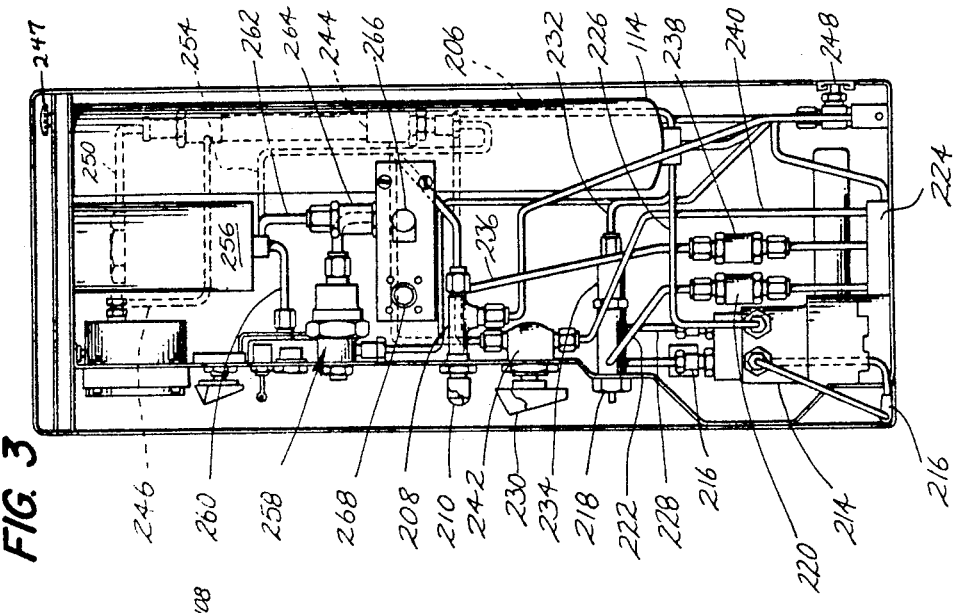
FIGURE 3 is a side elevational view of the interior of the apparatus of FIGURE 2 showing internal construction.
Figure 2:
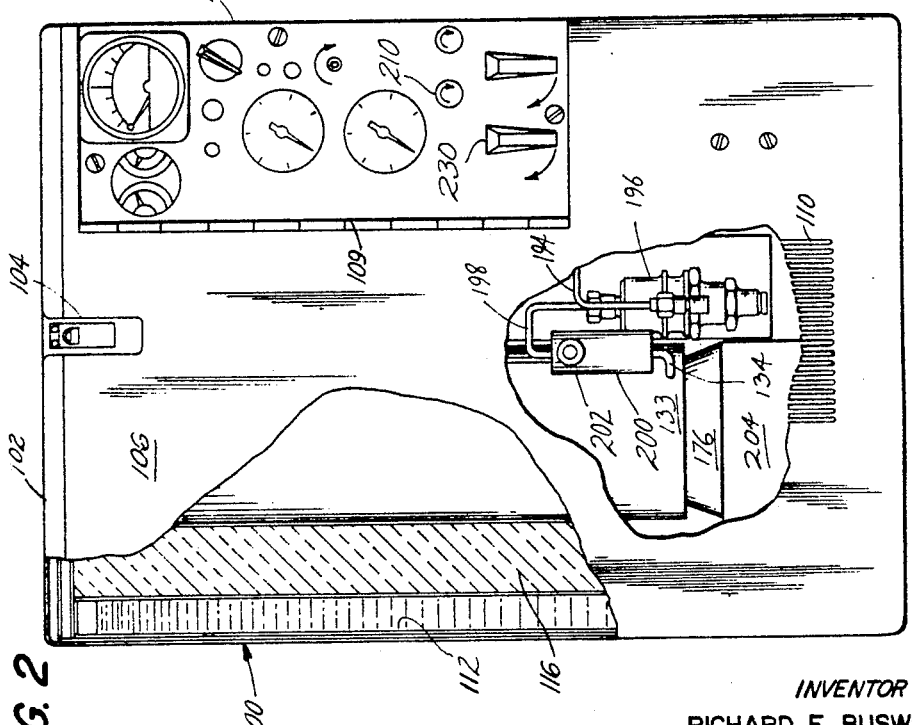
FIGURE 2 is a front elevational view of an apparatus embodying the present invention with portions of the housing and interior construction broken away to reveal internal construction.

Referring now to the apparatus specifically illustrated in FIGURES 2 and 3 of the attached drawings, the conversion apparatus is conveniently received within a housing generally designated by the numeral 100 having a top cover 102 secured by the latch 104. The front wall 106 has mounted therein an instrument panel board generally designated by the numeral 108 with switches and gauges to be described in detail hereinafter. A cover plate (not shown) is mounted on the hinges 109 to cover the panel 108 and the front wall 106 is also provided with a grill 110. Within the housing 100 are provided a water tank 112 and a fuel tank 114.

Figure 4:
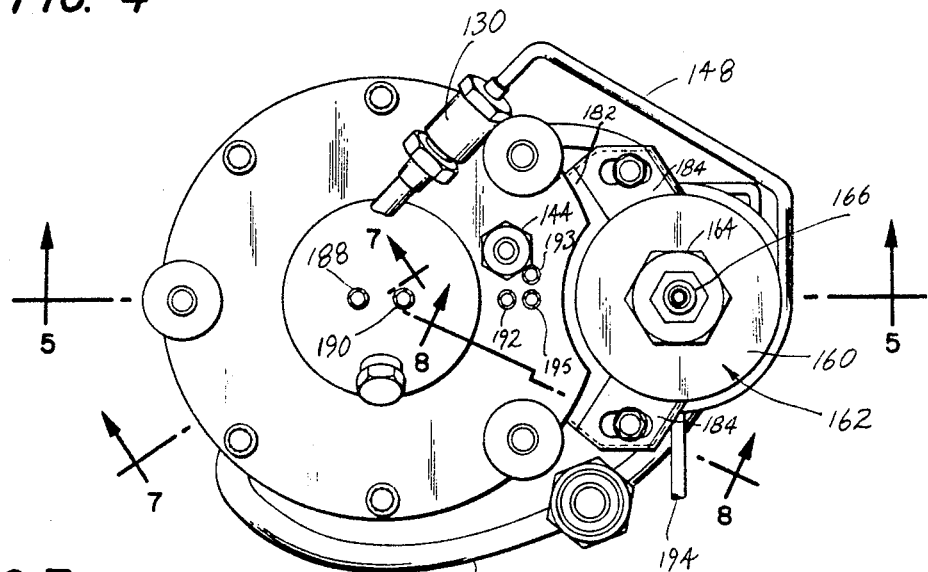
FIGURE 4 is a top plan view of the reactor-shift converter subassembly of the conversion apparatus illustrated in FIGURES 2 and 3.
Figure 5:
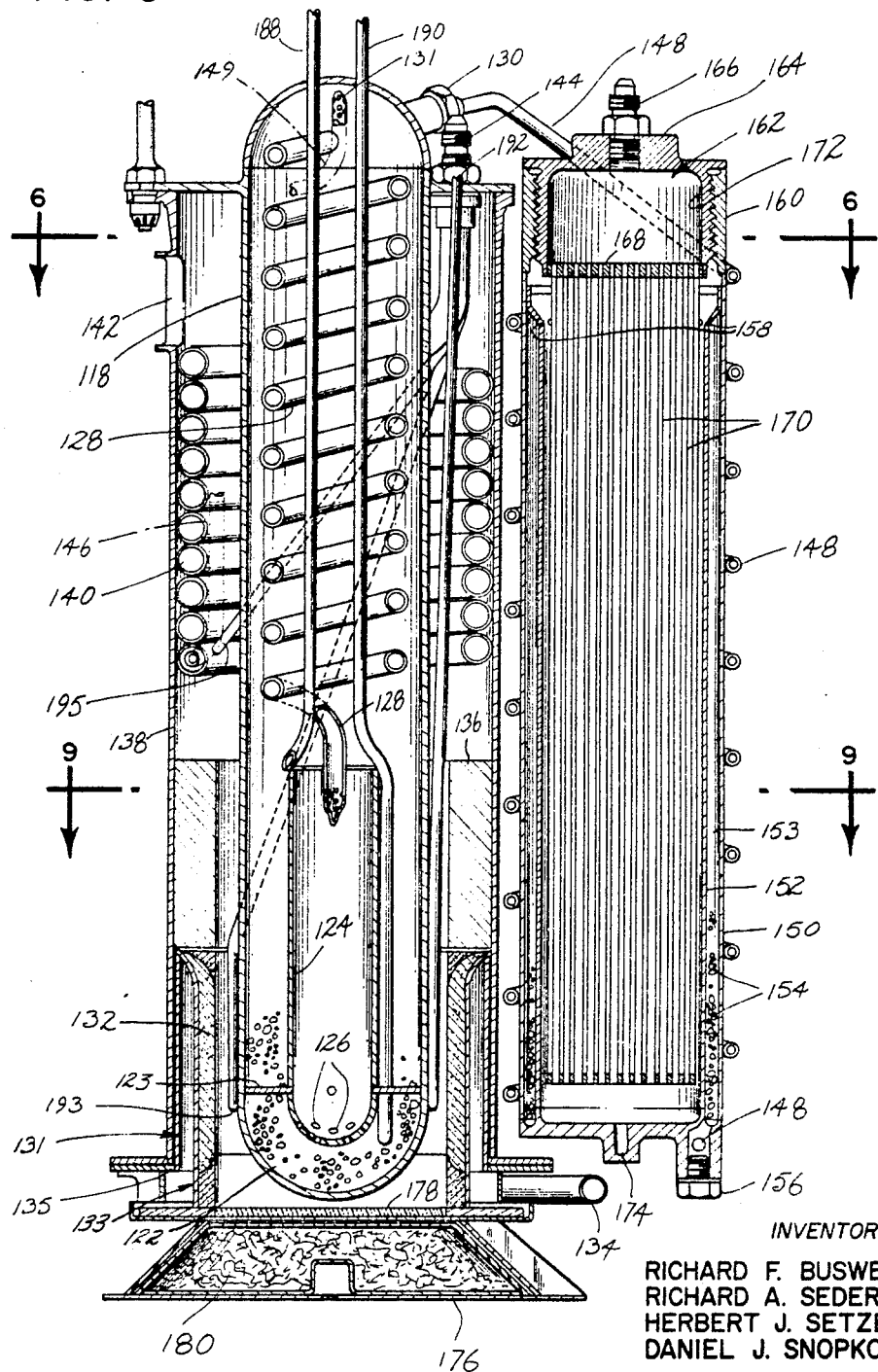
FIGURE 5 is a sectional view thereof along the line 5—5 of FIGURE 4.
Figure 9:
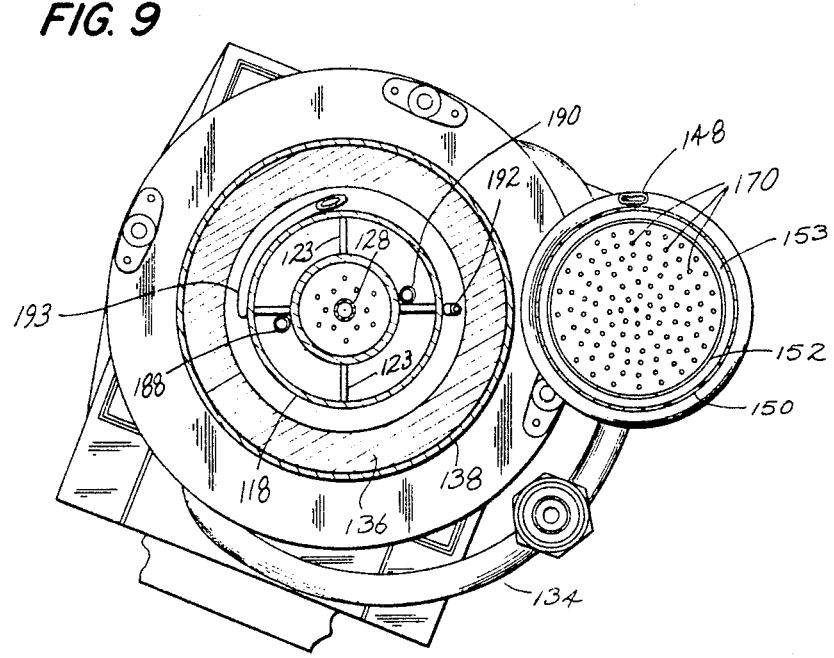
FIGURE 9 is a cross-sectional view thereof along the line 9—9 of FIGURE 5.
Figure 6:
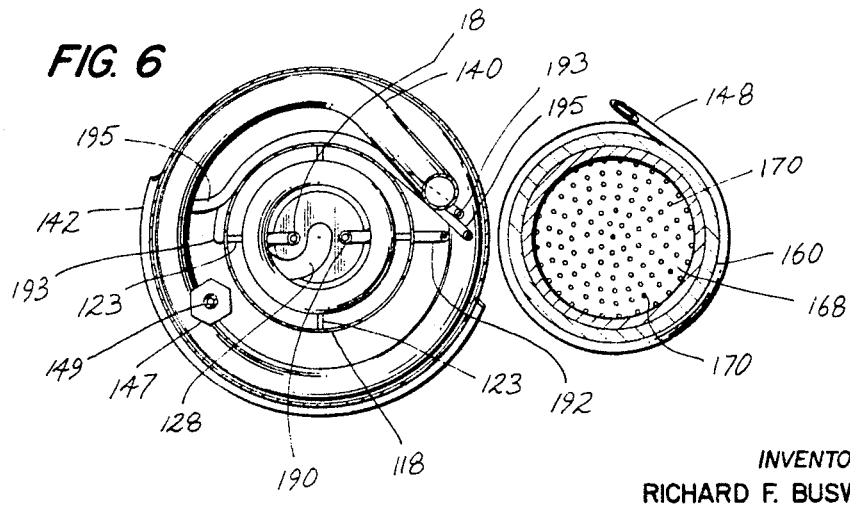
FIGURE 6 is a cross-sectional view thereof along the line 6—6 of FIGURE 5.

Seated within the housing 100 and insulated therefrom by the insulating material 116 is a converter-purifier assembly which is illustrated in detail separately in FIGURES 4–9. Referring first to FIGURE 5, the outer, capped tubular member 118 has therein a dehydrogenation catalyst 122 only partly shown but extending to the top of the outer tubular member 118. Supported and located by the wing elements 123 is an inner, capped tubular member 124 with perforations 126 in its bottom end which is disposed below the wing elements 123 but above the bottom of the outer tubular member 118. A coiled tube 128 extends from the interior of the inner tubular member 124 to the upper end of the outer tubular member 118 where it passes through the wall thereof and terminates in a fitting 130. An inlet 131 is provided adjacent the upper end of the outer tubular member 118 to feed in a gaseous stream of hydrocarbon and water which then passes downwardly through the catalyst 122. The stream then passes through the wing elements 123 and upwardly through the inner tubular member 124 and the coiled tube 128 wherein it imparts heat to the catalyst 122 thereabout to establish a thermal gradient therein as it loses its heat on its way to exit from the outer tubular member 118.

Figure 7:
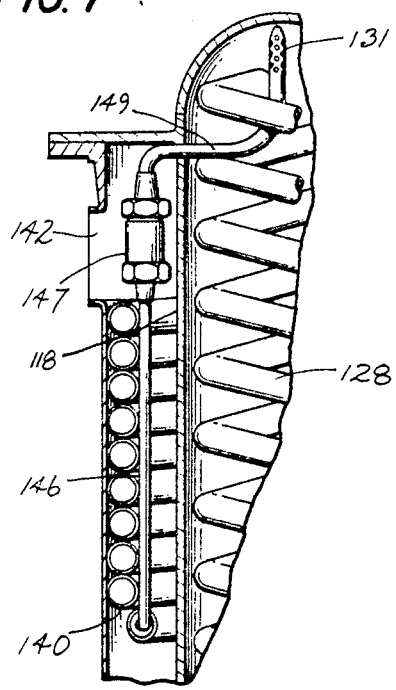
FIGURE 7 is a fragmentary sectional view thereof along the line 7—7 of FIGURE 4.

The lower portion of the outer tubular member 118 is directly heated by a fuel mixture burned in the burner assembly designated generally by the numeral 133. Within the casing 135 of the burner assembly is a generally cylindrical porous burner member 132 of refractory material conveniently fabricated from a mat of zirconia fibers and which is spaced from the tubular member 118. Above the burner assembly 133 is a cylindrical member 136 and the hot combustion gases are confined between the outer tubular member 118 and the shell 138 so as to pass upwardly in contact with the outer surface of the tubular member 118 and about the coiled boiler tube 140 disposed therebetween until vented through the outlet 142. A mixture of hydrocarbon and water fed to the boiler tube 140 at the fitting 144 is thus heated to a relatively high temperature by the combustion gases from the burner 132 which also serve to impart heat to and establish the thermal gradient in the upper portion of the tubular member 118. The heated stream from the boiler tube 140 is then conducted to the interior of the tubular member 118 by the feed conduit 146 which terminates in the fitting 147 and the tube 149, the end of which provides the feed inlet 131, as best seen in FIGURE 7.

The reacted stream is carried from the fitting 130 by the tubing 148 which coils about the exterior of the generally cylindrical shift reactor casing 150 so as to impart heat thereto while itself cooling prior to its passage into the shift reaction converter chamber 153 defined between the shift reactor casing 150 and the generally cylindrical purifier casing 152. Catalyst 154 is disposed therein and the carbon monoxide in the stream reacts with the water therein under the influence of the catalyst to produce additional hydrogen and carbon dioxide. Since the shift conversion is exothermic and occurs about the purifier casing 152, heat is imparted thereto. As is shown, a plug 156 is provided for access to the catalyst 154.

The wall of the purifier casing 152 is provided with perforations 158 adjacent the upper end thereof so that the gas entering at the bottom of the shift converter chamber 153 passes therethrough in contact with the catalyst 154 and thence into the purifier casing 152. At the upper ends of the casings 150, 152 is a cylindrical end piece 160 which has mounted therein a purifier tube bundle assembly generally designated by the numeral 162. The assembly 162 has a cap element 164 with a fitting 166 and carries a tube header 168 at its lower end in which are supported a multiplicity of hollow tubes 170. As can be seen, the tubes 170 are sealed at their lower end and open into the chamber 172 in the cap element 164. The tubes 170 are fabricated from a metal selectively permeable to hydrogen such as a palladium-silver alloy so that the hydrogen in the gaseous stream entering through the perforations 158 is extracted therefrom and is carried to the chamber 172 and thence outwardly through the fitting 166. The remaining gases in the stream are exhausted through the outlet 174.

As best seen in FIGURE 5, the shell 138 and burner assembly 133 are supported in the apparatus housing 100 above a slide member 176, which is insulated from the combustion gases by the insulating element 178. The slide member 176 may be slid from the shell 138 to allow heat and gases from a start-up burner 204 (shown in FIGURE 2) which may conveniently be of a Coleman type to supply heat to the catalyst bed. The slide member 176 also contains insulating material 180. Thus, the assembly may be supported within the housing 100. At the upper end, the shell 138 has a mounting flange 182 on which are mounted flanges 184 on the end piece 160 of the shift reactor-purifier as is best seen in FIGURES 4 and 8.

Figure 8:
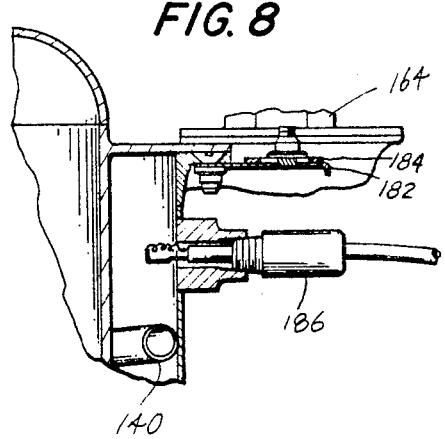
FIGURE 8 is a fragmentary sectional view thereof along the line 8—8 of FIGURE 4.

As also seen in FIGURE 8, an igniter 186 is provided in the shell 138 and operable in the spacing between the shell 138 and outer tubular member 118. Thermocouples 188, 190, 192, 193 and 195 are provided for determining the temperatures in the reactor, reactor wall and boiler exit.

Referring now again to FIGURES 2 and 3, the various conduits and additional elements of the apparatus are therein illustrated. The waste gas from the outlet 174 in the purifier casing 152 is carried by the conduit 194 to the back pressure regulator valve 196 and from the conduit 198 to the air ejector 200 wherein it is mixed with air coming through the air inlet 202. The air-waste gas mixture is then carried by the conduit 134 to the burner assembly 133. For initially supplying heat to the reactor assembly during start-up, a start-up burner 204, conveniently of the Coleman type, is disposed underneath the slide member 176 and obtains its fuel through the conduit 206 from the fuel tank 114 through the start-up burner fuel valve 208 which may be actuated by the switch 210.

In operation of the apparatus, water from the tank 112 is fed through the pump 214, fittings 216 and through the pressure switch 218. A water check valve, 220 is provided in the conduit 222 prior to the water-fuel mixing manifold 224.

Fuel for operation of the apparatus is obtained from the fuel tank 114 through the fuel conduit 226 and the pump 214. A fuel shut-off valve (not shown) is provided in the conduit 228, the handle of which may be seen bearing the numeral 230. If the fuel shut-off valve is closed, the fuel may be bled back to the tank through a conduit 232 through the fuel relief valve 234. During normal operation when the fuel sut-off valve is open, the fuel passes through the conduit 236 and the fuel check valve 238 to the water-fuel mixing manifold 224 wherein the two components are admixed. The mixture then passes through a conduit 240 and the system shut-off valve 242 into an outer annual spacing of the preheater 244 and then passes through the conduit 246 to the boiler tube 140 seen in FIGURE 5. A hand pump 247 is utilized to supply the initial operating pressure to the apparatus.

On shutdown, the system subsequent to the water-fuel mixing manifold 224 may be back-purged through the shutdown bleed valve 248. The drain valves (not shown) may also be used to empty the tanks if so desired.

Hydrogen from the purifier fitting 166 passes through the conduit 250 to an inner tube in the feed preheater 244 where it is in heat exchange relationship with the feed mixture passing thereabout so as to impart heat thereto while simultaneously losing a portion of its own heat. From the feed preheater, the hydrogen passes through the conduit 254 to the accumulator tank 256. The hydrogen pressure in the system is controlled by the hydrogen pressure relief valve generally designated by the numeral 258 which is coupled to the accumulator tank by the conduit 260.

Hydrogen for operation of the fuel cell passes through the conduit 262 and fittings 264 to a hydrogen manifold 266 which is connected to the fuel cell through fittings (not shown).

Power to operate the pump and various control devices is supplied from the fuel cell itself to the power inlet 268. The various switches and gauges of the apparatus are generally schematically represented in the control panel in FIGURE 2 of the drawings.

Thus, it can be seen from the foregoing detailed description that the pre-reaction or low-temperature reaction of the feedstock and steam to produce a methane-rich stream may be provided within the initial portion of a single reactor and catalyst bed with the high-temperature primary reaction occurring at the final portion thereof. Generally the predetermined operating conditions, particularly when employing fresh catalyst, exhibit a tendency toward carbon formation at the beginning of operation due to the taking place of most of the pre-reaction near the inlet or at the very beginning of the catalylst bed as a result of the high activity of the catalyst. As will be appreciated, the carbon formation in such a situation occurs by reason of the fact that the desired thermal incline for increasing fraction of fuel reaction is substantially obviated by the high acitivity of the catalyst. However, it has been shown both analytically and experimentally that the system compensates for the problem by adjusting through catalyst deterioration as a result of carbon formation so that more of the length of the catalyst bed is required for completion of the desired prereaction. Thus, an adjusted steady state is evolved which reliably indicates the required catalyst volume for a given hydrocarbon fuel and reactor design. It will be appreciated that this adjustment or compensation does not require decay or deterioration of the overall system and that only a finite amount of catalyst is involved. This factor has been readily proven in operation of prototype systems for over 500 hours without detection of carbon build-up within the catalyst.

Exemplary of the efficacy of the present invention is the following specific example:

EXAMPLE

To an apparatus constructed similarly to that illustrated in the attached drawings was fed a mixture of 0.309 pound per hour of a hydrocarbon fuel designated "JP-150," a Udex Raffinate manufactured by Texaco, and 1.074 pounds per hour of water. The JP–150 fuel has a hydrogen to carbon ratio of 0.180 and contains 1.8 percent olefins and 0.8 percent aromatics according to A.S.T.M. Test D–1319. Its viscosity at 100° Fahrenheit is 0.73 and its specific gravity (A.P.I.) is 63.8°. A distillation analysis on the Fahrenheit scale is as follows:

|  | Degrees |
|---|---|
| Initial boiling point | 240 |
| 10 percent | 267 |
| 20 percent | 270 |
| 50 percent | 284 |
| 90 percent | 306 |
| End point | 335 |

The catalyst employed in the tube providing the pre-reactor and primary reactors was "G–56" a proprietary nickel catalyst made by Girdler Catalyst Company. The catalyst was in the form of pellets ⅛ inch by ⅛ inch and the amount in the prereactor portion was 0.70 pound and the amount in the reactor portion was 0.50 pound. The weight of catalyst in the shift converter was 0.60 pound. The purifier tubes were fabricated from a palladium alloy containing 25 percent by weight of silver and with a wall thickness of 0.003 inch.

The apparatus was operated at a pressure of 200 pounds per square inch gauge. After a start-up period of about thirty minutes in which the unit was brought up to temperature and proper operating cycle by the start-up burner and combustion of the hydocarbon-rich waste gas from the purifier, the apparatus was put on stream. Thermocouples recorded the following temperatures at the points indicated:

|  | Degrees Fahrenheit |
|---|---|
| Bottom end of boiler | 935 |
| Prereactor upper end | 790 |
| Primary reactor entrance | 1035 |
| Primary reactor midpoint | 1245 |
| Primary reactor bottom end | 1420 |

```
                                    Degrees Fahrenheit
Wall between converter and purifer (bottom end) __  720
Wall between converter and purifier (upper end) __  500
```

Exiting from the apparatus was a pure hydrogen stream at the rate of 0.071 pounds per hour indicating a high degree of conversion efficiency. The above prereactor and reactor temperatures closely approximate the design temperatures of 800° Fahrenheit at the prereactor upper end, 1100° Fahrenheit at the primary reactor entrance and 1400° Fahrenheit at the primary reactor bottom end. Thus, it can be seen that the method and apparatus of the present invention provide a high degree of thermal efficiency and patentability.

As will be readily appreciated from the foregoing detailed description and specific example, the method of the present invention afford a realtively high degree of thermal efficiency which is adapted to relatively compact apparatus for producing a stream of highly pure hydrogen. The components have demonstrated long-lived operation with a relative minimum of difficulty and minimize external fuel requirements for the system. The sensible heat of the gaseous products is utilized to the greatest extent possible and simultaneously cools the gaseous stream for subsequent reactions. As can be appreciated, this minimization of requirements and relative simplicity of construction enables the design of a relatively compact assembly. In fact, the apparatus illustrated in the attached drawings is shown at ⅓ scale of an apparatus utilized to produce hydrogen for a fuel cell designed to generate 500 watts. The system itself and the apparatus have been tested at length and found to operate efficiently and with such freedom from difficulty as to enable utilization under field conditions by relatively inexperienced operating personnel.

Having thus described the invention, we claim:

1. In the method of providing substantially pure hydrogen from hydrogen-containing feedstocks, the steps comprising: mixing a hydrogen-containing carbonaceous feedstock with water; heating said mixture to elevate the temperature thereof to about 205 to 510° centigrade; passing said heated mixture through a first bed of a dehydrogenation catalyst at an outlet temperature of 370 to 650° centigrade to react substantially all of said feedstock to produce a methane rich stream; passing said stream from said first bed through an additional bed of a dehydrogenation catalyst at an outlet temperature of 700 to 990° centigrade to effect conversion of substantially all the methane in said stream to carbon oxide products and hydrogen; passing the stream from said additional bed through said first catalyst bed in heat exchange contact therewith and countercurrent to the flow of said heated mixture passing therethrough to establish a thermal decline from the outlet to the inlet end and to decrease the temperature of said stream; passing the decreased temperature stream through a shift conversion catalyst at a temeprature of 200 to 480° centigrade to convert substantially all the carbon monoxide in said stream to carbon dioxide; passing the stream from said shift conversion catalyst through a hydrogen purifier in surface contact with one surface of a membrane selectively permeable to hydrogen, the major portion of the hydrogen in said stream passing through said membrane; collecting substantially pure hydrogen from the other surface of said membrane in said purifier; burning the waste gas from said purifier adjacent said additional catalyst bed to impart heat thereto; and passing the combustion gases from said burning in heat exchange relationship with said mixture in said heating thereof to impart heat thereto.

2. The method in accordance with claim 1 wherein said feedstock is essentially a saturated hydrocarbon.

3. The method in accordance with claim 1 wherein said feedstock contains 6 to 10 carbon atoms.

4. The method in accordance with claim 1 wherein the water to carbon molar ratio is about 2.5–4.0:1.

5. The method in accordance with claim 1 wherein said thermal decline in said first bed is predetermined to avoid substantially the carbon forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

said catalyst converting substantially all of said feedstock to substantially methane, hydrogen and carbon oxide products.

6. The method in accordance with claim 1 wherein said first and additional catalyst beds are portions of a single continuous bed of catalyst.

7. The method in accordance with claim 1 wherein said combustion gases from said burning also pass in heat exchange relationship with the periphery of said first catalyst bed.

8. In the method of providing substantially pure hydrogen from hydrogen-containing feedstocks, the steps comprising: initially heating a mixture of a hydrogen-containing carbonaceous feedstock and water; further heating said mixture to elevate the temperature thereof to about 205 to 510° centigrade; passing said further heated mixture through a first bed of a dehydrogenation catalyst having an outlet temperature of 370 to 650° centigrade to react substantially all of said feedstock to produce a methane-rich stream; passing said stream frrom said first bed through an additional bed of a dehydrogenation catalyst at an outlet temperature of 700 to 990° centigrade to effect conversion of substantially all the methane in said stream to carbon oxide products and hydrogen; passing the stream from said additional bed through said first catalyst bed in heat exchange contact therewith and countercurrent to the flow of said heated mixture passing therethrough to estabilsh a thermal decline from the outlet to the inlet end and to decrease the temperature of said stream; passing the decreased temperature stream through a shift conversion catalyst at a temperature of 200 to 480° centigrade to convert substantially all the carbon monoxide in said stream to carbon dioxide; passing the stream from said shift conversion catalyst through a hydrogen purifier in surface contact with one surface of a membrane selectively permeable to hydrogen, the major portion of the hydrogen in said stream passing through said membrane; collecting substantially pure hydrogen from the other surface of said membrane in said purifier; passing said pure hydrogen in heat exchange relationship with said mixture in said initial heating thereof to elevate the temperature of said mixture and to reduce the temperature of said hydrogen; burning the waste gas from said purifier adjacent said additional catalyst bed to impart heat thereto; and passing the combustion gases from said burning in heat exchange relationship with said mixture in said further heating thereof to impart heat thereto.

9. The method in accordance with claim 8 wherein said shift conversion catalyst is in heat exchange relationship with said hydrogen purifier so as to impart heat thereto.

10. The method in accordance with claim 8 wherein said feedstock is essentially a saturated hydrocarbon.

11. The method in accordance with claim 8 wherein said thermal decline in said first bed is predetermined to avoid substantially the carbon forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

said catalyst converting substantially all of said feedstock to substantially methane, hydrogen and carbon oxide products.

12. The method in accordance with claim 8 wherein said first and additional catalyst beds are portions of a single continuous bed of catalyst.

13. In the method of providing substantially pure hydrogen from hydrogen-containing carbonaceous feedstocks, the steps comprising: heating a mixture of a hydrogen-containing carbonaceous feedstock and water to elevate the temperature thereof to about 205 to 510° centigrade; passing said heated mixture through a first bed of dehydrogenation catalyst at an outlet temperature of 370 to 650° centigrade to react substantially all of said feedstock to produce a methane-rich stream; passing said stream from said first bed through an additional bed of a dehydrogenation catalyst at an outlet temperature of 700 to 990° centigrade to effect conversion of substantially all the methane in said stream to carbon oxide products and hydrogen; and passing the stream from said additional bed through said first catalyst bed in heat exchange contact therewith and countercurrent to the flow of said heated mixture passing therethrough to establish a thermal decline from the outlet to the inlet end and to decrease the temperature of said stream.

14. The method in accordance with claim 13 wherein said feedstock is essentially a saturated hydrocarbon.

15. The method in accordance with claim 13 wherein the water to carbon molar ratio is about 2.5–4.0:1.

16. The method in accordance with claim 13 wherein said thermal decline in said first bed is predetermined to avoid substantially the carbon forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

said catalyst converting substantially all of said feedstock to substantially methane, hydrogen and carbon oxide products.

17. The method in accordance with claim 13 wherein said first and additional catalyst beds are portions of a single continuous bed of catalyst.

18. The method in accordance with claim 13 wherein waste gases following extraction of the hydrogen from the stream adjacent said additional catalyst bed to import heat thereto and combustion gases from said burning pass in heat exchange relationship with the periphery of said first catalyst bed and then in heat exchange relationship with said mixture to effect heating thereof.

19. In the method of providing substantially pure hydrogen from hydrogen-containing carbonaceous feedstocks, the steps comprising: heating a mixture of a hydrocarbon and water in a water to carbon molar ratio of about 2.5 to 4.0:1 to elevate the temperature thereof to about 205 to 510° centigrade; passing said heated mixture through a continuous bed of a dehydrogenation catalyst said bed having an initial prereactor portion with an outlet temperature of 370 to 650° centigrade to react substantially all of said feedstock to produce a methane-rich stream and a primary reactor portion with an outlet temperature of 700 to 990° centigrade to effect conversion of substantially all the methane in said stream to carbon oxide products and hydrogen; and passing the stream from the outlet end of said primary reactor portion through said bed of catalyst in said prereactor portion in heat exchange contact therewith and countercurrent to the flow of said heated mixture passing therethrough to establish a thermal decline from the outlet to the inlet end and to decrease the temperature of said stream.

20. The method in accordance with claim 19 wherein said thermal decline in said initial prereactor portion of said bed of dehydrogen catalyst is predetermined to avoid substantially the carbon forming reactions:

$$2CO \rightarrow CO_2 + C$$
$$CH_4 \rightarrow C + 2H_2$$
$$CO_2 + 2H_2 \rightarrow C + 2H_2O$$
$$CO + H_2 \rightarrow C + H_2O$$

said catalyst converting substantially all of said feedstock to substantially methane, hydrogen and carbon oxide products.

21. In the method of providing substantially pure hydrogen from hydrogen-containing feedstocks, wherein there are employed the steps comprising initially heating a mixture of a hydrogen-containing carbonaceous feedstock and water; passing said mixture through a bed of a steam conversion catalyst to obtain a gaseous stream containing hydrogen, carbon monoxide and water; passing said gaseous stream through a bed of shift conversion catalyst at a temperature of 200 to 480° centigrade to convert substantially all the carbon monoxide in said stream to carbon dioxide; passing the stream from said shift conversion catalyst through a hydrogen purifier in surface contact with one surface of a membrane selectively permeable to hydrogen, the major portion of the hydrogen in said stream passing through said membrane; collecting substantially pure hydrogen from the other surface of said membrane in said purifier, the improvement wherein said shift conversion catalyst is in heat exchange relationship with said purifier so as to impart heat thereto and wherein said pure hydrogen is passed in heat exchange relationship with said mixture in said initial heating thereof to elevate the temperature of said mixture and to reduce the temperature of said hydrogen.

22. The method in accordance with claim 21 wherein said bed of shift conversion catalyst is disposed about said purifier to provide said heat exchange relationship.

References Cited

UNITED STATES PATENTS 3,251,652   5/1966   Pfefferle _____ 23—213

EARL C. THOMAS, *Primary Examiner.*

EDWARD STERN, *Assistant Examiner.*

U.S. Cl. X.R.

23—212, 213, 262, 288; 48—196, 94; 25—373; 260—676